US012334079B2

(12) United States Patent
Baughman et al.

(10) Patent No.: US 12,334,079 B2
(45) Date of Patent: Jun. 17, 2025

(54) AI BASED SYSTEM AND METHOD FOR CORNERS OF TRUST FOR A CALLER

(71) Applicant: INTERNATIONAL BUSINESS MACHINES CORPORATION, Armonk, NY (US)

(72) Inventors: Aaron K. Baughman, Cary, NC (US); Shikhar Kwatra, San Jose, CA (US); Saurabh Yadav, Bangalore (IN); Eric Jeffery, Monument, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 17/447,579

(22) Filed: Sep. 14, 2021

(65) Prior Publication Data

US 2023/0085012 A1    Mar. 16, 2023

(51) Int. Cl.
| | |
|---|---|
| G10L 17/06 | (2013.01) |
| G06F 40/166 | (2020.01) |
| G06F 40/30 | (2020.01) |
| G10L 25/18 | (2013.01) |
| G10L 25/24 | (2013.01) |
| H04M 3/436 | (2006.01) |

(52) U.S. Cl.
CPC ............ *G10L 17/06* (2013.01); *G06F 40/166* (2020.01); *G06F 40/30* (2020.01); *G10L 25/18* (2013.01); *G10L 25/24* (2013.01); *H04M 3/436* (2013.01)

(58) Field of Classification Search
CPC ......... G10L 17/00; G10L 17/06; G10L 25/00; G10L 25/18; G10L 25/24; G06F 40/00; G06F 40/166; G06F 40/30; H04M 3/00; H04M 3/436

See application file for complete search history.

(56) References Cited

U.S. PATENT DOCUMENTS

| | | | |
|---|---|---|---|
| 7,136,458 B1 | 11/2006 | Zellner | |
| 10,289,817 B2 | 5/2019 | Ristock | |
| 10,380,614 B1 * | 8/2019 | Battre | .............. G06F 16/951 |

(Continued)

FOREIGN PATENT DOCUMENTS

| | | |
|---|---|---|
| CA | 2105034 C | 12/1997 |
| CN | 110913081 A | 3/2020 |

OTHER PUBLICATIONS

Disclosed Anonymously, "Cognitive Phone Call Management with Trust Factor," IP.com, IP.com No. IPCOM000258869D, IP.com Publication Date: Jun. 20, 2019, 7 pages.

(Continued)

*Primary Examiner* — Daniel C Washburn
*Assistant Examiner* — Sean E Serraguard
(74) *Attorney, Agent, or Firm* — Rakesh Roy

(57) ABSTRACT

A computer captures a voice of a user. The computer determines a frequency spectrum and a voice pattern of the voice. The computer identifies one or more topics of the voice by transcribing the voice by a natural language processing. The computer identifies the user based on matching the frequency spectrum of the voice to the frequency spectrum of the conversation and the pattern of the voice to the pattern of the conversation when a conversation is intercepted and determines a trust score based on comparing the one or more topics to the one or more topics extracted from the conversation.

20 Claims, 7 Drawing Sheets

(56) References Cited

U.S. PATENT DOCUMENTS

| | | | |
|---|---|---|---|
| 10,484,532 B1 | 11/2019 | Newman | |
| 10,666,792 B1* | 5/2020 | Marzuoli | H04M 3/436 |
| 2007/0076853 A1* | 4/2007 | Kurapati | H04M 3/436 |
| | | | 379/1.01 |
| 2009/0067410 A1* | 3/2009 | Sterman | H04L 65/1101 |
| | | | 370/352 |
| 2015/0347734 A1* | 12/2015 | Beigi | H04L 9/3268 |
| | | | 726/28 |
| 2018/0130473 A1 | 5/2018 | Odinak | |
| 2018/0152558 A1* | 5/2018 | Chan | H04W 4/16 |
| 2018/0286429 A1* | 10/2018 | Bostick | A61B 5/4803 |
| 2018/0324297 A1 | 11/2018 | Kent | |
| 2021/0058507 A1 | 2/2021 | Cornwell | |
| 2021/0105577 A1 | 4/2021 | Baughman | |
| 2021/0120121 A1* | 4/2021 | McCourt | G10L 15/197 |
| 2021/0136200 A1* | 5/2021 | Li | G10L 17/26 |
| 2021/0158074 A1* | 5/2021 | Wray | G06Q 10/1053 |
| 2021/0193174 A1* | 6/2021 | Enzinger | G10L 17/00 |
| 2022/0165275 A1* | 5/2022 | Gupta | G06F 21/32 |

OTHER PUBLICATIONS

Disclosed Anonymously, "System and Method to Dynamically Authenticate a Caller with Voice Signature using Smart Phone," IP.com, IP.com No. IPCOM000247470D, IP.com Publication Date: Sep. 9, 2016, 6 pages.

Firoozjaei et al., "Detecting False Emergency Requests Using Callers' Reporting Behaviors and Locations," 2016 30th International Conference on Advanced Information Networking and Applications Workshops, IEEE, 2016, pp. 243-247.

Anonymous, "Business consulting services," IBM, Accessed: Jun. 14, 2021 https://www.ibm.com/services/business, 10 pages.

Mell et al., "The NIST Definition of Cloud Computing", National Institute of Standards and Technology, Special Publication 800-145, Sep. 2011, 7 pages.

\* cited by examiner

AI BASED SYSTEM AND METHOD FOR CORNERS OF TRUST FOR A CALLER

BACKGROUND

The present invention relates, generally, to the field of computing, and more particularly to utilizing natural language processing (NLP) to identify spam calls.

Natural language processing (NLP) is a subfield of computer science and AI that deals with linguistics, information engineering, and artificial intelligence in order to provide interactions between computers and humans, typically in natural languages. Furthermore, NLP establishes approaches as to programming and designing computers in order to process and analyze large amounts of natural language data. Recent approaches are utilizing graphic processing units (GPUs) with integrated deep learning software or a vector-vector-matrix architecture (VVMA) that greatly reduces the latency of the NLP.

SUMMARY

According to one embodiment, a method, computer system, and computer program product for identifying a spam call is provided. The present invention may include a computer captures a voice of a user. The computer determines a frequency spectrum and a voice pattern of the voice. The computer identifies one or more topics of the voice by transcribing the voice by a natural language processing. The computer identifies the user based on matching the frequency spectrum of the voice to the frequency spectrum of the conversation and the pattern of the voice to the pattern of the conversation when a conversation is intercepted and determines a trust score based on comparing the one or more topics to the one or more topics extracted from the conversation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
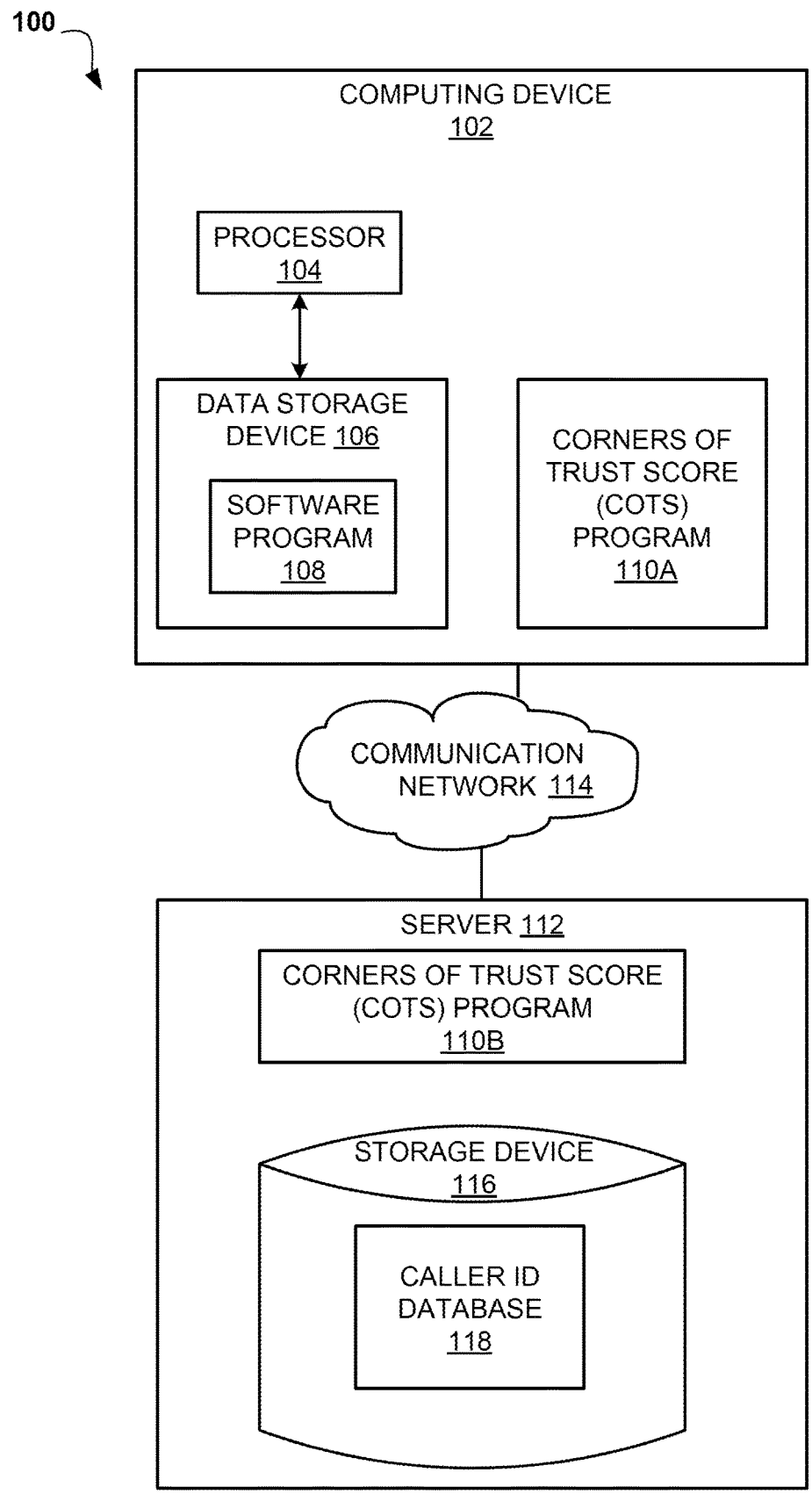
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to identifying a spam caller based on a trust score that is derived based on statements made by a user in previous calls. The following described exemplary embodiments provide a system, method, and program product to, among other things, identify a spam caller by calculating a caller trust score based on caller statements weighted using natural language processing (NLP). Therefore, the present embodiment has the capacity to improve the technical field of computerized call filtering by enabling conversion of a person's speech into a trust score using an NLP and corners of trust.

As previously described, natural language processing (NLP) is a subfield of computer science and AI that deals with linguistics, information engineering, and artificial intelligence in order to provide interactions between computers and humans, typically in natural languages. Furthermore, NLP establishes approaches as to programming and designing computers in order to process and analyze large amounts of natural language data. Recent approaches are utilizing graphic processing units (GPUs) with integrated deep learning software or a vector-vector-matrix architecture (VVMA) that greatly reduces the latency of the NLP.

Many users receive spam calls daily. Callers and businesses lose countless amounts of time and money due to wasted time spent with these erroneous and nefarious calls. Although many various solutions to filter spam calls exist, no solution is available when a caller makes fraudulent statements to different users, thus pretending and possibly defrauding users. As such, it may be advantageous to, among other things, implement a system that identifies when a caller is making fraudulent statements and warns a user by presenting a trust score that represents whether a caller is trustworthy.

According to one embodiment, a computing system may determine a trust level of the caller based on previous statements made by the caller in previous calls or even during a call. The trust level may be determined using a trust confidence scale that is based on a Hilbert space transformation that may transfer raw features of the caller into a corners of trust distribution. Hilbert space typically generalizes the notion of Euclidean space by extending the methods of vector algebra and calculus from the two-dimensional Euclidean plane and three-dimensional space to spaces with any finite or infinite number of dimensions. The Hilbert space is a vector space equipped with an inner product operation that enables lengths and angles to be defined typically allows the techniques of calculus to be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to determine a spam caller based on analyzing the previous and current conversations of a caller and determining a trust score based on differences in topic features of the previous conversations.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a corners of trust score (COTS) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a corners of trust score (COTS) program 110B and a storage device 116 and communicating with the client computing device 102 via the communication network 114, in accordance with embodiments of the invention. The storage device 116 may store the caller ID database 118 that is used by the COTS program 110B. As will be discussed with reference to FIG. 5 the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the COTS program 110A, 110B may be a program capable of analyzing the callers voice and content and based on the content determine a trust score that represents whether the caller is a spammer. The corners of trust method is explained in further detail below with respect to FIGS. 3 and 4.

Figure 2:
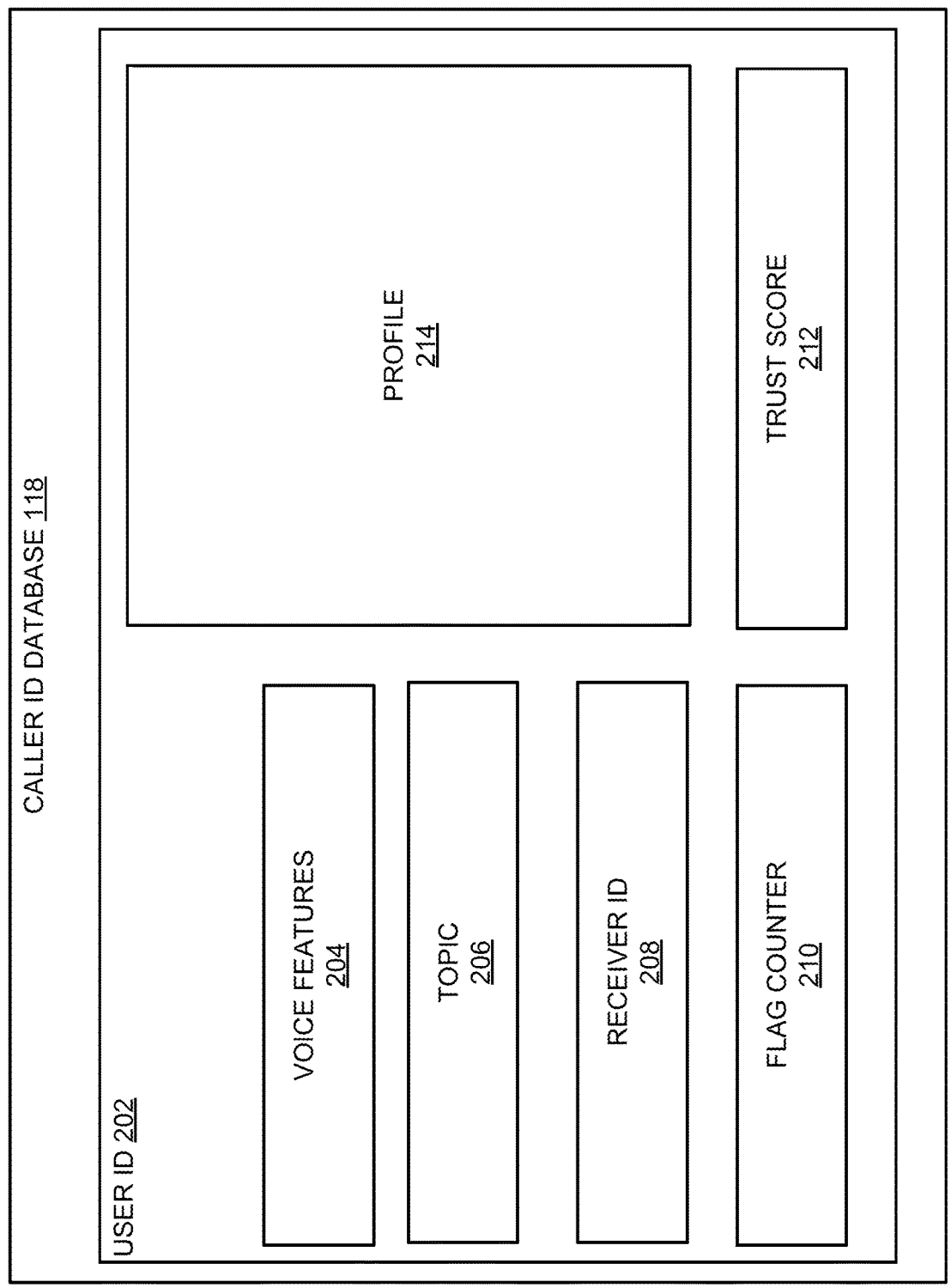
FIG. 2 is a block diagram of a caller ID database structure according to at least one embodiment.

Referring now to FIG. 2, a block diagram of a caller ID database structure according to at least one embodiment is depicted. According to an example embodiment, the caller ID database 118 may have a user ID 202 that has an associated voice feature 204, topic 206, receiver ID 208, flag counter 210, trust score 212 and profile 214 parameters. The voice features 204 may store data extracted from the conversation using a Mel Frequency Cepstral Coefficients (MFCC) algorithm. The MFCC algorithm is a technique which takes voice sample in an audio data format as inputs and calculates coefficients unique to a particular sample that allows to identify the caller by comparing the coefficients to coefficients of previously recorded samples. The topic 206 may be one or more topics of previous conversations of the caller stored as a key word or a number that represents a predetermined topic. Receiver ID 208 may store a frequency spectrum of the voice of the caller using a Gaussian or T-mixture models, such as non-Bayesian Gaussian mixture model (GMM). The flag counter may be a numerical value that counts a number of times when the COTS program identified that the caller cannot be trusted as will be explained with respect to FIG. 4. Trust score 212 may be a numerical value that is determined using space transformation based on the Dirichlet distribution approach as described in more detail below with respect to FIG. 4.

Figure 3:
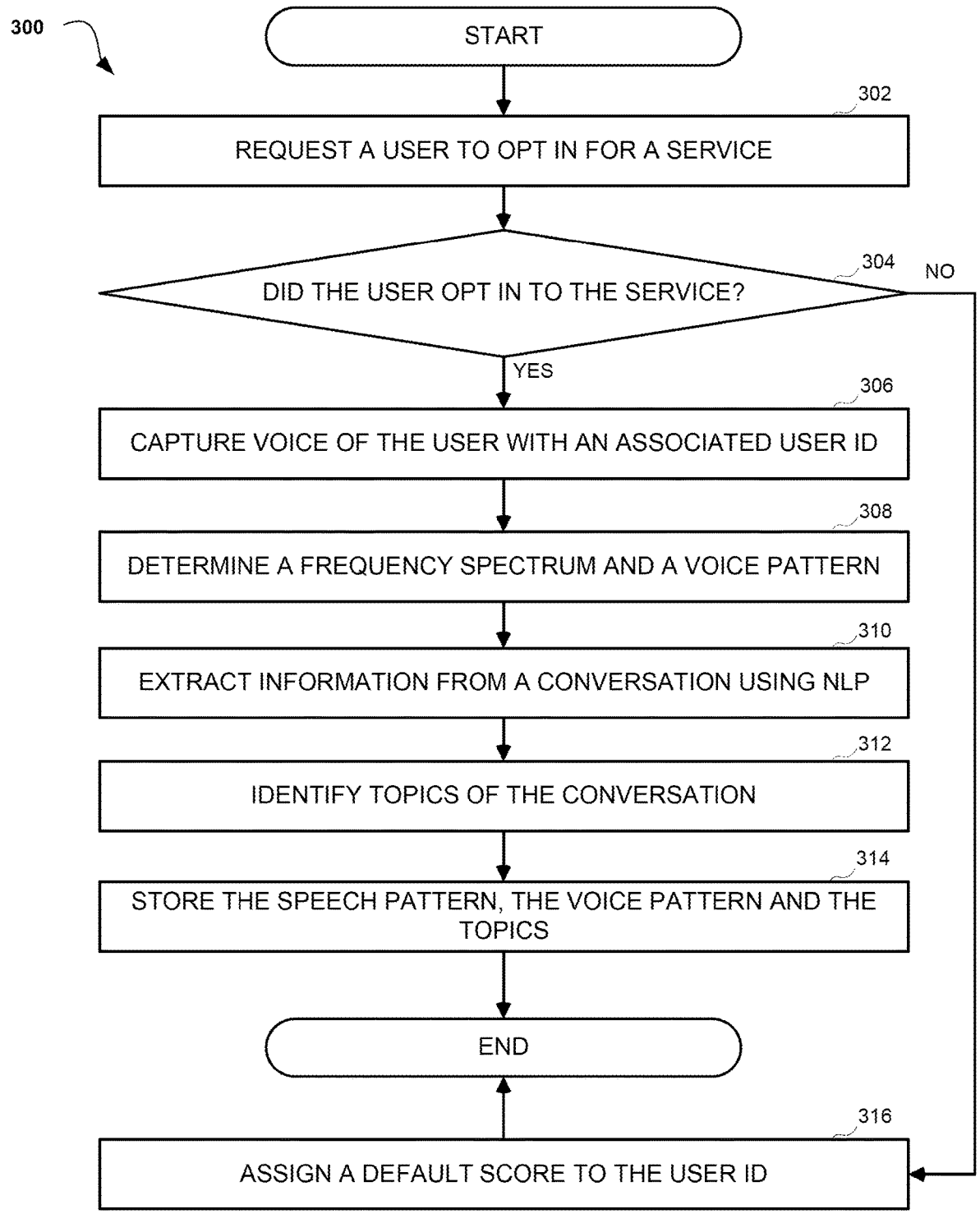
FIG. 3 is an operational flowchart illustrating an enrollment process of a corners of trust score process according to at least one embodiment.

Referring now to FIG. 3, an operational flowchart illustrating an enrollment process of a corners of trust score process according to at least one embodiment process 300 is depicted according to at least one embodiment. At 302, the COTS program 110A, 110B requests a user to opt in for a service. According to an example embodiment, the COTS program 110A, 110B may be used by a large enterprise such as a cellphone network provider and request each user to voluntarily opt in for the service and fill out data in profile 214. In another embodiment, the COTS program 110A, 110B may request to opt in due to privacy law requirements.

Then, at 304, the COTS program 110A, 110B determines whether the user opted in to the service. According to an example embodiment, the COTS program 110A, 110B may display to the user a message using a graphical user interface (GUI) and receive a response indicating the user's opt in acquiescence or denial. If the COTS program 110A, 110B determines that the user opted in for the services (step 304, "YES" branch), the COTS program 110A, 110B may continue to step 306 to capture voice of the user as an audio data with an associated user ID. If the COTS program 110A, 110B determines that the user refused the request to opt in for the service (step 304, "NO" branch), the COTS program 110A, 110B may continue to step 316 to assign a default score to the user ID.

Next, at 306, the COTS program 110A, 110B captures voice of the user with an associated user ID. According to an example embodiment, the COTS program 110A, 110B may save the voice of the user on a computing device 102 as an audio data file and make it available only to the COTS program 110A, 110B or encrypt the recorded voice in order to avoid privacy law violations or possible hacker attacks. In another embodiment, the COTS program 110A, 110B may save all of the conversations of the user and process the recorded conversations in accordance with the described below.

Then, at 308, the COTS program 110A, 110B determines a frequency spectrum and a voice pattern. According to an example embodiment, the COTS program 110A, 110B may identify the voice pattern by extracting Mel-frequency coefficients using the MFCC algorithm. Mel-frequency cepstral coefficients (MFCCs) are coefficients that collectively make up a mel-frequency cepstrum (MFC). The MFC is a representation of the short-term power spectrum of a sound, based on a linear cosine transform of a log power spectrum on a nonlinear mel scale of frequency. The mel scale is a perceptual scale of pitches judged by listeners to be equal in distance from one another. Typically, the speech may be converted into a speech pattern of 15-dimensional data which is captured during an ongoing conversation. According to an example embodiment, the COTS program 110A, 110B may identify the speaker and determine a frequency spectrum of the speaker using a Gaussian or T-mixture model or a combination of both, such as non-Bayesian Gaussian mixture model (GMM) algorithm.

Next, at 310, the COTS program 110A, 110B extracts information from a conversation using NLP. According to an example embodiment, the COTS program 110A, 110B may utilize a speech-to-text engine such as IBM Watson® (IBM Watson and all IBM Watson-based trademarks and logos are trademarks or registered trademarks of International Business Machines Corporation and/or its affiliates) and Named Entity Recognition (NER) and Entity Resolution (ER) techniques to extract entities from the conversation that was transcribed by the NLP.

Then, at 312, the COTS program 110A, 110B identifies topics of the conversation. According to an example embodiment, the COTS program 110A, 110B may use an automatic text summarization such as Sumy automatic text summarizer and then a Latent Dirichlet Allocation (LDA) model to identify topics and profiling information.

Next, at 314, the COTS program 110A, 110B stores the speech pattern, the voice pattern and the topics. According to an example embodiment, the COTS program 110A, 110B may store the determined data under user id 202 associated with the user where speech pattern is stored in voice features 204, the speech pattern is stored in receiver ID 208 and the topic features are stored in topic 206. Furthermore, if profiling information is identified, it may be stored in profile 214.

Then, at 316, the COTS program 110A, 110B assigns a default score to the user ID. According to an example embodiment, when the user refused to opt in or if the user is unknown, the COTS program 110A, 110B may assign a reserved value in the trust score 212 in order to identify that a user associated with the user id 202 refused to opt in to the system or is unknown. For example, if the trust score represents a percentage range [0-100]. the COTS program 110A, 110B may use a default score as 0 or 100 that will represent that the user either refused to opt in or for some reason, did not enroll with the service.

Figure 4:
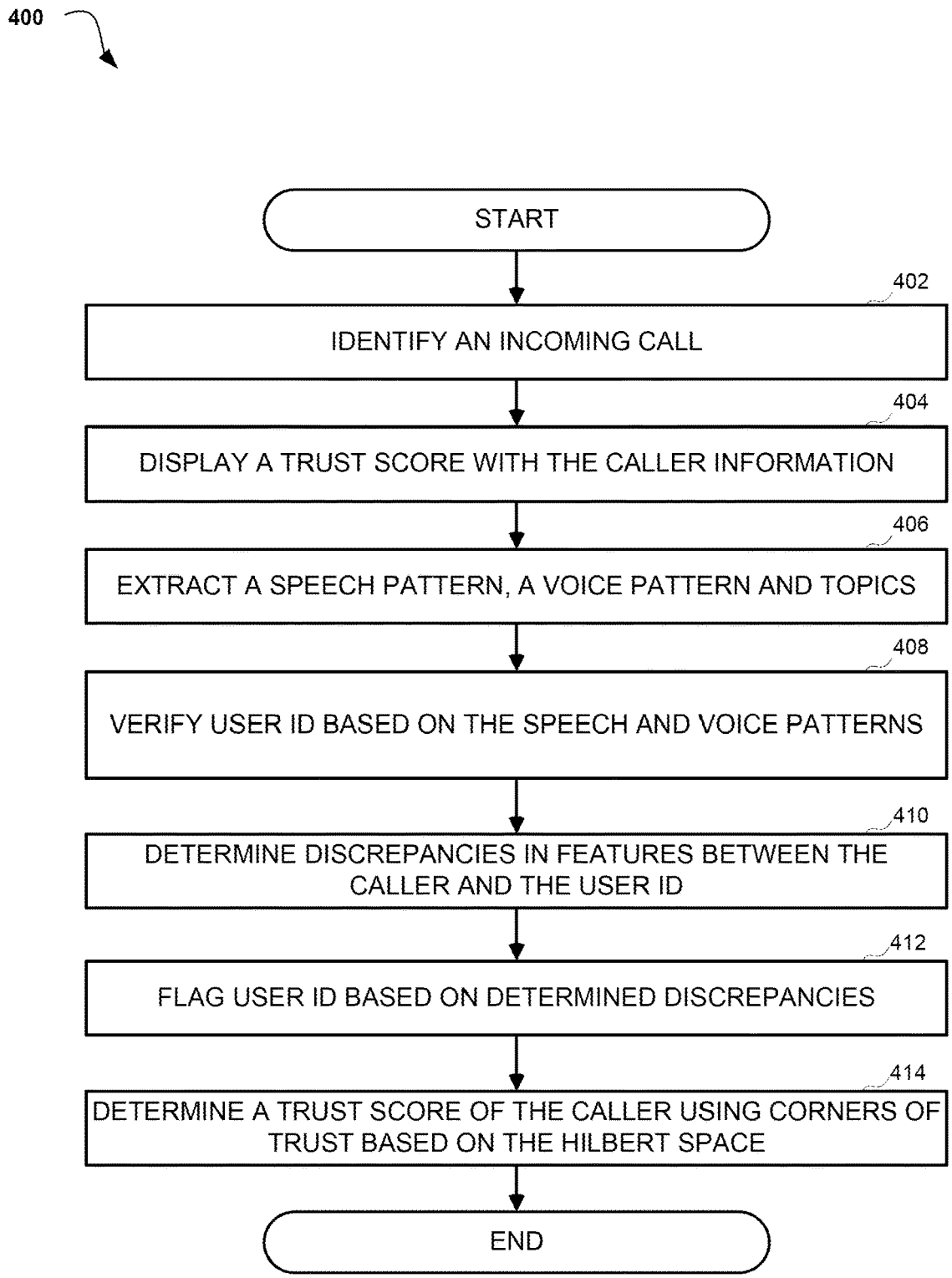
FIG. 4 is an operational flowchart illustrating a corners of trust score process for spam identification according to at least one embodiment.

Referring now to FIG. 4, an operational flowchart illustrating a corners of trust score process for spam identification process according to at least one embodiment process 400 is depicted according to at least one embodiment. At 402, the COTS program 110A, 110B identifies an incoming call. According to an example embodiment, the COTS program 110A, 110B may monitor for an incoming call by controlling all of the installed video, voice or phone call software using an application programming interface (API). In another embodiment, the COTS program 110A, 110B may monitor when the microphone is activated by the user and identify the microphone usage as an incoming call.

Next, at 404, the COTS program 110A, 110B displays a trust score with the caller information. According to an example embodiment, the COTS program 110A, 110B may search the caller ID database 118 in real time for caller data that was transmitted with the call and, if found, display the trust score 212 value associated with the caller. When the trust score equals to a default number, the COTS program 110A, 110B may displays that the caller opted out from the service or was never enrolled. In another embodiment, the COTS program 110A, 110B may display a word or a symbol representing whether the caller is trusted or not by comparing the trust score to a predetermined threshold value. For example, if the predetermined threshold value is ser to 80 and the trust score value is 82, the COTS program 110A, 110B may display "Trusted" message on the screen of the computing device.

Then, at 406, the COTS program 110A, 110B extracts a speech pattern, a voice pattern and topics of previous conversations. As previously mentioned, when the conversation or an incoming call are identified, the COTS program 110A, 110B may extract the voice pattern by extracting "Mel" coefficients using the MFCC algorithm. Typically, the speech may be converted into a speech pattern such as a multidimensional vector which is captured during an ongoing conversation. According to an example embodiment, the COTS program 110A, 110B may identify the speaker and determine a frequency spectrum of the speaker using a Gaussian or T-mixture model or a combination of both such as GMM algorithm. The topics may be extracted using a speech to text engine coupled with NER and an automatic text summarization with an LDA model.

Next, at 408, the COTS program 110A, 110B verifies a user ID based on the speech and voice patterns. According to an example embodiment, the COTS program 110A, 110B may, especially when caller identification of phone number is unavailable, identify the user ID of the caller using a feature matching algorithm based on voice and frequency features that may be accessed from voice features 204 and receiver ID 208 and compared to the speech and voice patterns extracted during the conversation.

Then, at 410, the COTS program 110A, 110B determines discrepancies in features between the caller and the user ID. According to an example embodiment, the COTS program 110A, 110B may perform one-to-one matching of the features identified from the conversation to the stored features in profile 214 of the caller. According to an example embodiment, whenever the COTS program 110A, 110B determines any discrepancy or negative correlation in the profile, the COTS program 110A, 110B may increase the flag counter 210 for each instance a discrepancy or negative correlation is identified. For example, if a caller states his name not in accordance to the name stored in the profile, the COTS program 110A, 110B may increase the flag counter.

Next, at 412, the COTS program 110A, 110B flags user id based on determined discrepancies. According to an example embodiment, the COTS program 110A, 110B may increase the flag counter 210 any time a discrepancy or negative correlation is identified when each discrepancy or negative correlation is determined in the profile and reduce the trust score 212 using a linearly varying positive function, such as (updated trust score)=stored trust score)−(linear function (flag counter value)).

Then, at 414, the COTS program 110A, 110B determines a trust score of the caller using corners of trust based on the Hilbert space. According to an example embodiment, the COTS program 110A, 110B may define corners of trust based on the Dirichlet distribution using the equations:

$$f(x_1, \ldots, x_K; \alpha_1, \ldots, \alpha_K) = \frac{1}{B(\alpha)} \prod_{i=1}^{K} x_i^{\alpha_i - 1}$$

and $$B(\alpha) = \frac{\prod_{i=1}^{K} \Gamma(\alpha_i)}{\Gamma\left(\sum_{i=1}^{K} \alpha_i\right)}, \alpha = (\alpha_1, \ldots, \alpha_K).$$

The more likely the caller is in the corner of trust the higher the trust score.

The distribution may be trained using samples of callers where the $\alpha$ changes the distribution towards the corners of the shape of the Hilbert space. The $\alpha$ values may be obtained using trust scores, along speech rate, vocabulary used, knowledge about an asserted domain caller provenance or other data available in the user id 202.

It may be appreciated that FIG. 3-4 provide only an illustration of one implementation and does not imply any limitations with regard to how different embodiments may be implemented. Many modifications to the depicted environments may be made based on design and implementation requirements. In another embodiment, the trust score may be displayed during the conversation thus in case a caller is defrauding the user the value of the trust score may represent it in a real time.

Figure 5:
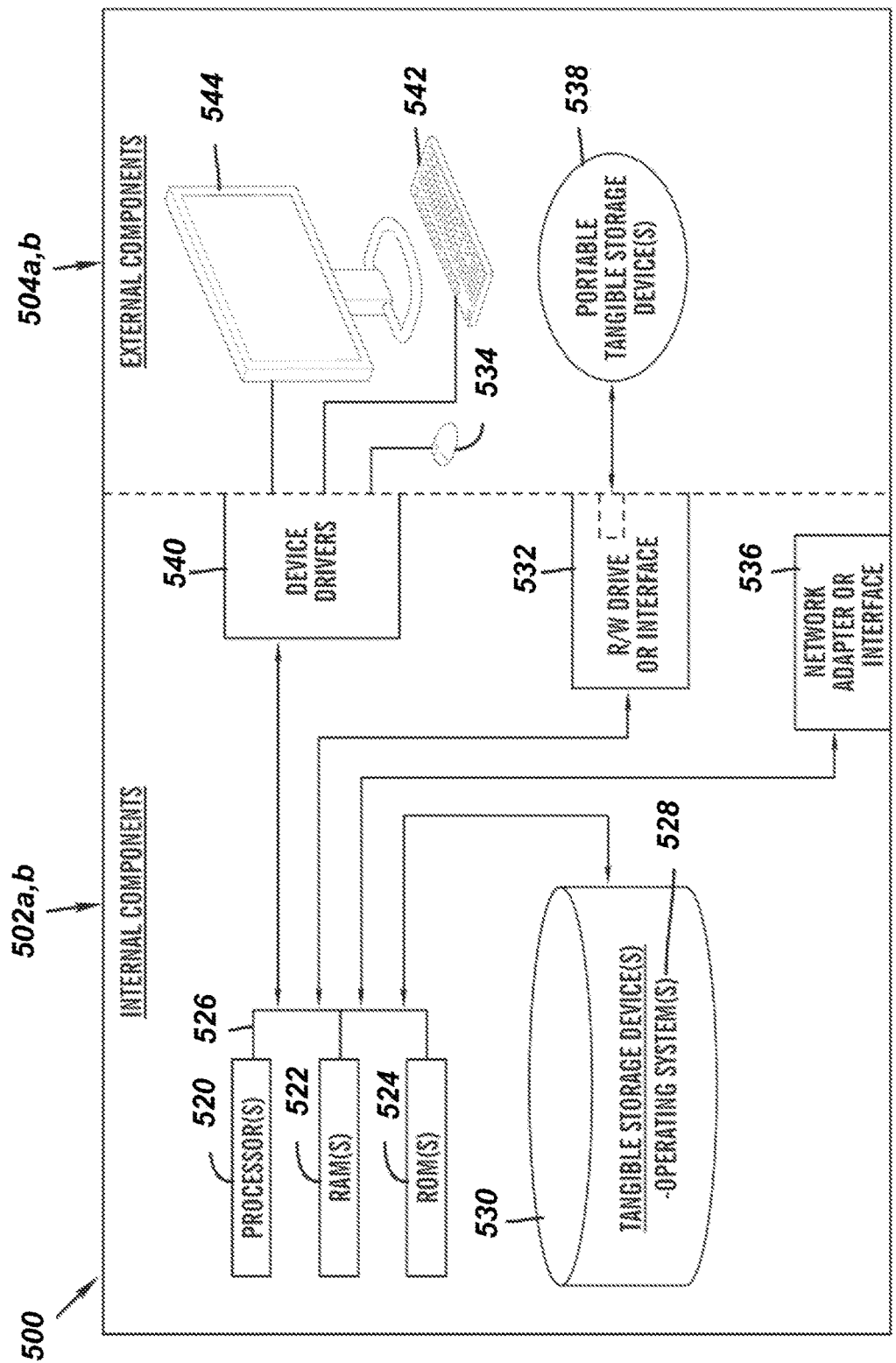
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 3. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the COTS program 110A in the client computing device 102, and the COTS program 110B in the server 112 are stored on one or more of the respective computer-readable tangible storage devices 330 for execution by one or more of the respective processors 520 via one or more of the respective 5AMs 322 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the COTS program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the COTS program 110A in the client computing device 102 and the COTS program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the COTS program 110A in the client computing device 102 and the COTS program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
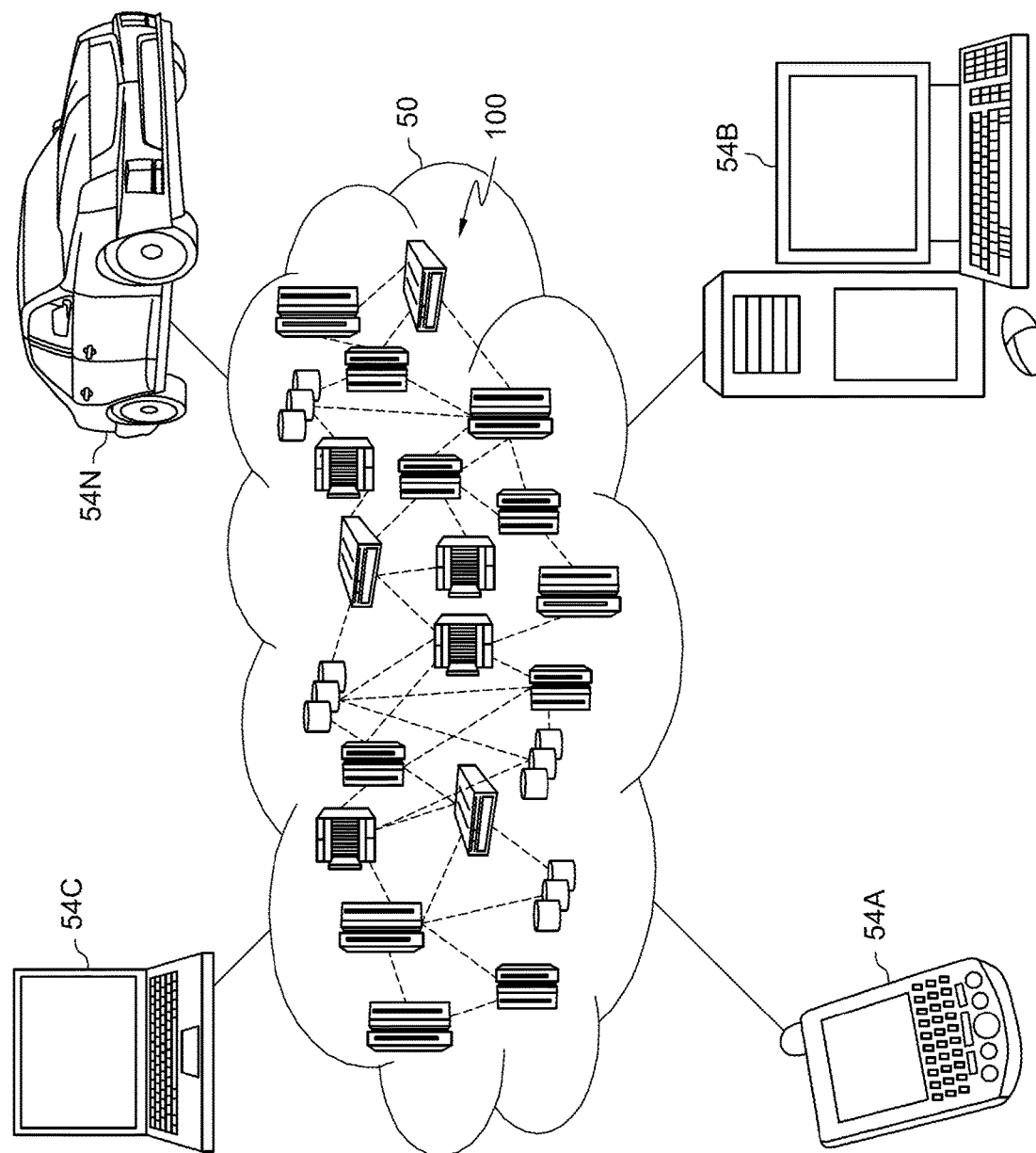
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
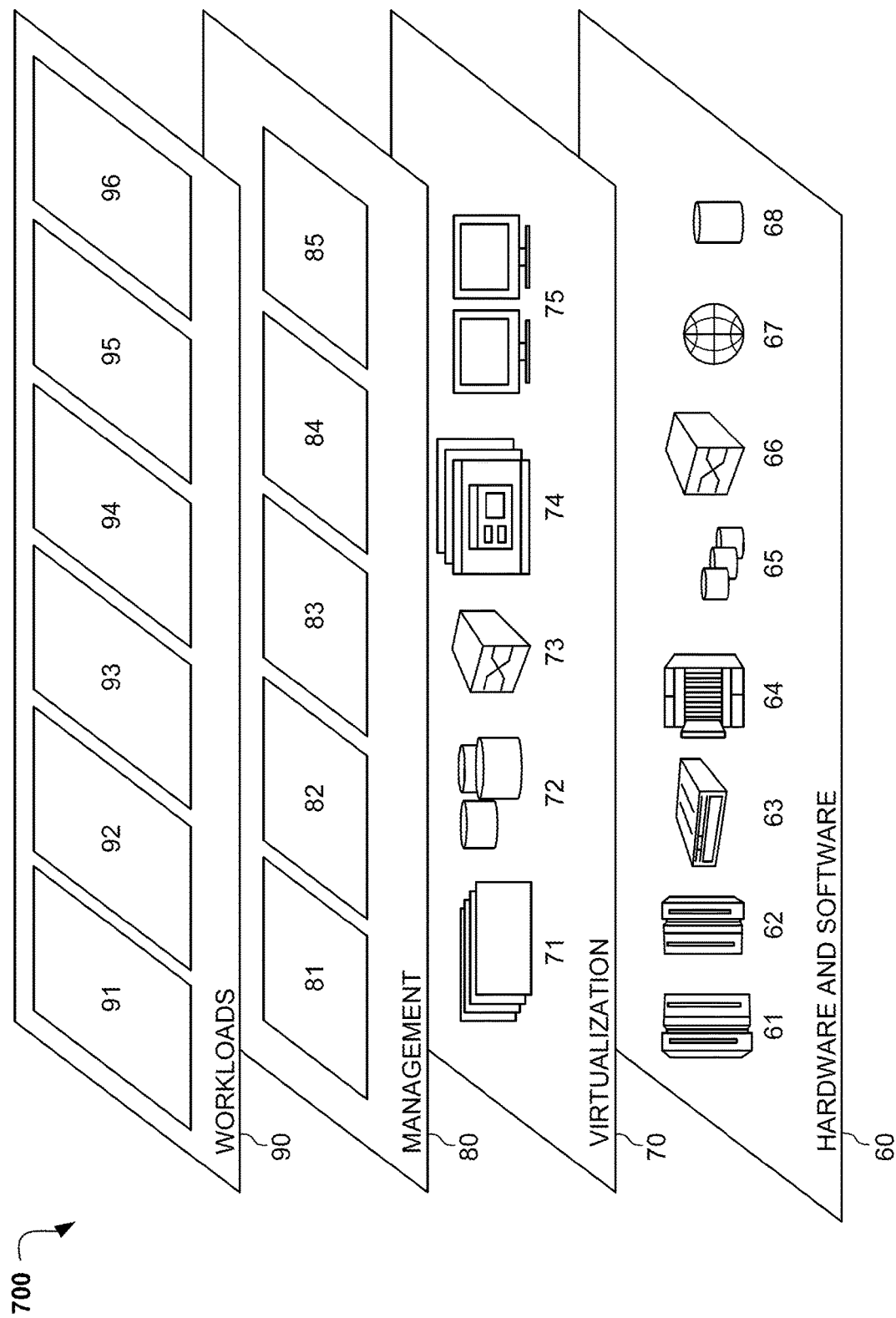
FIG. 7 depicts abstraction model layers according to an embodiment of the present invention.

Referring now to FIG. 7, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and corner of trust-based call evaluation 96. Corner of trust-based call evaluation 96 may relate to transcribing a conversation using an NLP and determining topic features of the conversations and profile features of a caller. When additional calls are received the trust score of the user may be derived by comparing the profile and topic features of the caller to the previously determined and using corer of trust model based on Dirichlet distribution determine a trust score.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for identifying a spam call, the method comprising:
  capturing an audio data associated with a voice of a user;
  determining a user frequency spectrum and a user voice pattern associated with the voice of the user;
  identifying, using natural language processing (NLP), one or more first topics communicated by the user in a previous conversation including the user as a caller;
  based on detecting a call from the caller to a receiver, identifying the caller as the user based on matching the user frequency spectrum to a caller frequency spectrum determined from a current conversation in the call and the user voice pattern to a caller voice pattern determined from the current conversation in the call;
  responsive to identifying the caller as the user, displaying on a computing device of the receiver, a stored trust score associated with the caller, wherein the stored trust score indicates to the receiver whether the caller is trustworthy based on a previous call between the caller and a different receiver, wherein the previous call includes the previous conversation; and
  determining an updated trust score for the caller relative to the stored trust score based on comparing the one or more first topics communicated by the caller in the previous conversation to one or more second topics communicated by the caller in the current conversation with the receiver to identify differences between the one or more first topics and the one or more second topics communicated by a same person, wherein the updated trust score is determined based on a plurality of flag counters, wherein at least one of the plurality of flag counters are generated based on a discrepancy by the caller in a user name pronunciation as compared to a stored user name pronunciation.

2. The method of claim 1, wherein the user frequency spectrum and the caller frequency spectrum are determined by a non-Bayesian Gaussian mixture model.

3. The method of claim 1, wherein the user voice pattern and the caller voice pattern are determined by a Mel Frequency Cepstral Coefficients algorithm.

4. The method of claim 1, wherein identifying, using NLP, the one or more first topics associated with the user from the previous conversation including the user further comprises:
  determining the one or more first topics by an automatic text summarizer and a Latent Dirichlet Allocation model.

5. The method of claim 1, further comprising:
  storing the user frequency spectrum, the user voice pattern, the one or more first topics, the stored trust score, and the updated trust score under a user ID associated with the user.

6. The method of claim 1, wherein the stored trust score and the updated trust score are further determined by a Dirichlet distribution model having parameters obtained by training the Dirichlet distribution model with training samples of callers.

7. The method of claim 1, further comprising:
  requesting the user to opt in for a service;
  based on determining the user refused to opt in for the service, setting the stored trust score to a default value; and
  based on determining the stored trust score is set to the default value, causing the computing device of the receiver of the call to display that the user refused to opt in for the service, wherein the user is the caller.

8. A computer system for identifying a spam call, the computer system comprising: one or more processors, one or more computer-readable memories, one or more computer readable tangible storage medium, and program instructions stored on at least one of the one or more tangible storage medium for execution by at least one of the one or more processors via at least one of the one or more memories, wherein the computer system is capable of performing a method comprising:
  capturing an audio data associated with a voice of a user;
  determining a user frequency spectrum and a user voice pattern associated with the voice of the user;
  identifying, using natural language processing (NLP), one or more first topics communicated by the user in a previous conversation including the user as a caller;
  based on detecting a call from the caller to a receiver, identifying the caller as the user based on matching the user frequency spectrum to a caller frequency spectrum determined from a current conversation in the call and the user voice pattern to a caller voice pattern determined from the current conversation in the call;
  responsive to identifying the caller as the user, displaying on a computing device of the receiver, a stored trust score associated with the caller, wherein the stored trust score indicates to the receiver whether the caller is trustworthy based on a previous call between the caller and a different receiver, wherein the previous call includes the previous conversation; and
  determining an updated trust score for the caller relative to the stored trust score based on comparing the one or more first topics communicated by the caller in the previous conversation to one or more second topics communicated by the caller in the current conversation with the receiver to identify differences between the one or more first topics and the one or more second topics communicated by a same person, wherein the updated trust score is determined based on a plurality of flag counters, wherein at least one of the plurality of flag counters are generated based on a discrepancy by the caller in a user name pronunciation as compared to a stored user name pronunciation.

9. The computer system of claim 8, wherein the user frequency spectrum and the caller frequency spectrum are determined by a non-Bayesian Gaussian mixture model.

10. The computer system of claim 8, wherein the user voice pattern and the caller voice pattern are determined by a Mel Frequency Cepstral Coefficients algorithm.

11. The computer system of claim 8, wherein identifying, using NLP, the one or more first topics associated with the user from the previous conversation including the user further comprises:
  determining the one or more first topics by an automatic text summarizer and a Latent Dirichlet Allocation model.

12. The computer system of claim 8, further comprising:
  storing the user frequency spectrum, the user voice pattern, the one or more first topics, the stored trust score, and the updated trust score under a user ID associated with the user.

13. The computer system of claim 8, wherein the stored trust score and the updated trust score are further determined by a Dirichlet distribution model having parameters obtained by training the Dirichlet distribution model with training samples of callers.

14. The computer system of claim 8, further comprising:
requesting the user to opt in for a service;
based on determining the user refused to opt in for the service, setting the stored trust score to a default value; and
based on determining the stored trust score is set to the default value, causing the computing device of the receiver of the call to display that the user refused to opt in for the service, wherein the user is the caller.

15. A computer program product for identifying a spam call, the computer program product comprising: one or more computer-readable storage medium and program instructions stored on at least one of the one or more storage medium, the program instructions executable by a processor, the program instructions comprising:
program instructions to capture an audio data associated with a voice of a user;
program instructions to determine a user frequency spectrum and a user voice pattern associated with the voice of the user;
program instructions to identify, using natural language processing (NLP), one or more first topics communicated by the user in a previous conversation including the user as a caller;
based on detecting a call from the caller to a receiver, program instructions to identify the caller as the user based on matching the user frequency spectrum to a caller frequency spectrum determined from a current conversation in the call and the user voice pattern to a caller voice pattern determined from the current conversation in the call;
responsive to identifying the caller as the user, program instructions to display on a computing device of the receiver, a stored trust score associated with the caller, wherein the stored trust score indicates to the receiver whether the caller is trustworthy based on a previous call between the caller and a different receiver, wherein the previous call includes the previous conversation; and
program instructions to determine an updated trust score for the caller relative to the stored trust score based on comparing the one or more first topics communicated by the caller in the previous conversation to one or more second topics communicated by the caller in the current conversation with the receiver to identify differences between the one or more first topics and the one or more second topics communicated by a same person, wherein the updated trust score is determined based on a plurality of flag counters, wherein at least one of the plurality of flag counters are generated based on a discrepancy by the caller in a user name pronunciation as compared to a stored user name pronunciation.

16. The computer program product of claim 15, wherein the user frequency spectrum and the caller frequency spectrum are determined by a non-Bayesian Gaussian mixture model.

17. The computer program product of claim 15, wherein the user voice pattern and the caller voice pattern are determined by a Mel Frequency Cepstral Coefficients algorithm.

18. The computer program product of claim 15, wherein the program instructions to identify, using NLP, the one or more first topics associated with the user from the previous conversation including the user further comprises:
program instructions to determine the one or more first topics by an automatic text summarizer and a Latent Dirichlet Allocation model.

19. The computer program product of claim 15, further comprising:
program instructions to store the user frequency spectrum, the user voice pattern, the one or more first topics, the stored trust score, and the updated trust score under a user ID associated with the user.

20. The computer program product of claim 15, wherein the stored trust score and the updated trust score are further determined by a Dirichlet distribution model having parameters obtained by program instructions to train the Dirichlet distribution model with training samples of callers.

* * * * *